United States Patent [19]

Morrison

[11] Patent Number: 4,490,791
[45] Date of Patent: Dec. 25, 1984

[54] ADAPTIVE GAS TURBINE ACCELERATION CONTROL

[75] Inventor: Terry Morrison, Vernon, Conn.

[73] Assignee: Chandler Evans Inc., West Hartford, Conn.

[21] Appl. No.: 369,531

[22] Filed: Apr. 19, 1982

[51] Int. Cl.³ .................. G05B 13/00; F04D 27/02
[52] U.S. Cl. ................... 364/431.02; 364/150; 364/151; 340/965; 340/966; 60/39.281
[58] Field of Search .............. 364/431.02, 149, 150, 364/151; 60/39.281; 340/965, 966

[56] References Cited

U.S. PATENT DOCUMENTS

| | | | |
|---|---|---|---|
| 2,974,483 | 3/1961 | Sanders | 60/39.281 |
| 3,482,396 | 12/1969 | Nelson et al. | 60/39.281 |
| 4,117,668 | 10/1978 | Elsaesser et al. | 364/431.02 |
| 4,249,238 | 2/1981 | Spang et al. | 364/151 |
| 4,407,013 | 9/1983 | Arcara et al. | 364/149 |

Primary Examiner—Jerry Smith
Assistant Examiner—Karl Huang

[57] ABSTRACT

An acceleration schedule, from which data is derived for use in calculating fuel flow during acceleration of a gas turbine engine, is modified each time the engine surges so as to avoid future surges.

6 Claims, 6 Drawing Figures

ACCELERATION SCHEDULE & MODIFIER LOOK UP TABLE

| COMPUTER ACCEL. SCHEDULE ADDRESS | ACCELERATION VALUE STORED | ENGINE SPEED POINT | ASSOCIATED MODIFIER ADDRESS | MODIFIER STORED VALUE |
|---|---|---|---|---|
| A + m | N DOT/CDP(m) | NG(m) | B + m | $K_M(m)$ |
| ----- | ----- | ----- | ----- | ----- |
| A + n | N DOT/CDP(n) | NG(n) | B + n | $K_M(n)$ |
| ----- | ----- | ----- | ----- | ----- |
| A | N DOT/CDP(0) | NG(0) | B | $K_M(0)$ |

AT ENGINE SPEED NG, WHERE NG(n) ⩾ NG ⩾ NG(n-1)

$$\text{ACCEL. SCHEDULE} = \frac{\text{N DOT/CDP}(n) - \text{N DOT/CDP}(n-1)}{NG(n) - NG(n-1)} \times [NG - NG(n-1)] + \text{N DOT/CDP}(n-1)$$

$$\text{MODIFIER SCALE FACTOR} = \frac{K_M(n) - K_M(n-1)}{NG(n) - NG(n-1)} \times [NG - NG(n-1)] + K_M(n-1)$$

CORRECTED ACCEL. SCHEDULE = ACCEL. SCHEDULE × MODIFIER SCALE FACTOR

*Fig. 4* ved in the equipment ages. However,
ADAPTIVE GAS TURBINE ACCELERATION CONTROL

BACKGROUND OF THE INVENTION (1) Field of the Invention

The present invention relates to the exercise of control over the delivery of fuel to a gas turbine engine and particularly to the modification of a pre-programmed acceleration control schedule as a result of engine surges. More specifically, this invention is directed to an adaptive gas turbine engine acceleration control wherein, in response to engine surges, a programmed acceleration schedule is modified on-line to avoid future surges when the same operating conditions are encountered. Accordingly, the general objects of the present invention are to provide novel and improved methods and apparatus of such character.

(2) Description of the Prior Art

During operation of a gas turbine engine the condition known as "surge" may be encountered. Engine surge is a mismatch between the speed of the compressor blades and the incoming air. Gas turbine engine surges are characterized by a sudden and large loss of power, a loss of air flow, an increase in temperature and mechanical vibration. These mechanical vibrations, as well as the temperature increases, impose substantial stress on the engine and particularly on the turbine blades. While also occurring under other operating conditions, engine surge will most often occur during acceleration.

Prior attempts to ensure that engine surge will not occur have concentrated on the establishment of fuel flow rate schedules. Thus, for example, prior art fuel controls will be pre-programmed with an acceleration schedule and, in theory, if fuel flow is maintained in accordance with the requirements of the schedule, the engine is accelerated without surge. It is to be noted that, if an excess of fuel is delivered to the engine during surge, the engine is likely to stay in the surge condition or experience multiple surges. The prior art controls will typically include a safety factor which is known as the surge margin. Thus, the surge margin will be taken into account in deriving the acceleration schedule and the engine will be capable of accepting a predetermined percentage of additional fuel flow before surge will occur.

Engine controls are designed and implemented for the operating characteristics of a new engine. However, the characteristics of an engine and/or its fuel metering system will vary as the equipment ages. Accordingly, what may have initially been an adequate surge margin may, with engine and/or fuel control deterioration, no longer ensure that the engine will not surge. Prior art closed loop acceleration controls essentially constitute a plot of the ratio of the rate of change of gas generator speed to compressor inlet pressure versus corrected gas generator speed. This type of control is known in the art as an NDOT/PT2 control. If the engine surges, an NDOT/PT2 control will in itself increase fuel flow to compensate for the stalled acceleration. This increase in fuel flow, in turn, increases the probability that the engine will not accelerate through the surge prone area, i.e., multiple surges will result, and corrective action by the pilot will be required.

SUMMARY OF THE INVENTION

The present invention overcomes the above-discussed and other deficiencies of the prior art by providing for active modification of the acceleration schedule of a gas turbine engine fuel control. In response to an engine surge the region of the acceleration schedule where the surge was encountered will be lowered to increase surge margin.

Apparatus in accordance with the present invention senses the decay rate of engine compressor discharge pressure during surge and modifies the pre-programmed acceleration schedule so as to increase surge margin. Thus, in accordance with a preferred embodiment, an adaptive acceleration schedule is provided wherein "modifiers" are stored which correspond to each of the stored acceleration schedule breakpoints. The modifiers are scale factors which are normally equal to unity. However, each time a surge is detected, the modifier which corresponds to the point on the acceleration schedule where the surge was experienced will be decremented by a preselected percentage. The fuel flow related information from the acceleration schedule is multiplied by the modifier with the result that, subsequent to a surge having been detected, future accelerations will be modified within a small corrected speed band surrounding the surge point.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 4 comprises an acceleration schedule and modifier look-up table which will facilitate understanding of the invention;

DESCRIPTION OF THE DISCLOSED EMBODIMENT

Figure 5:
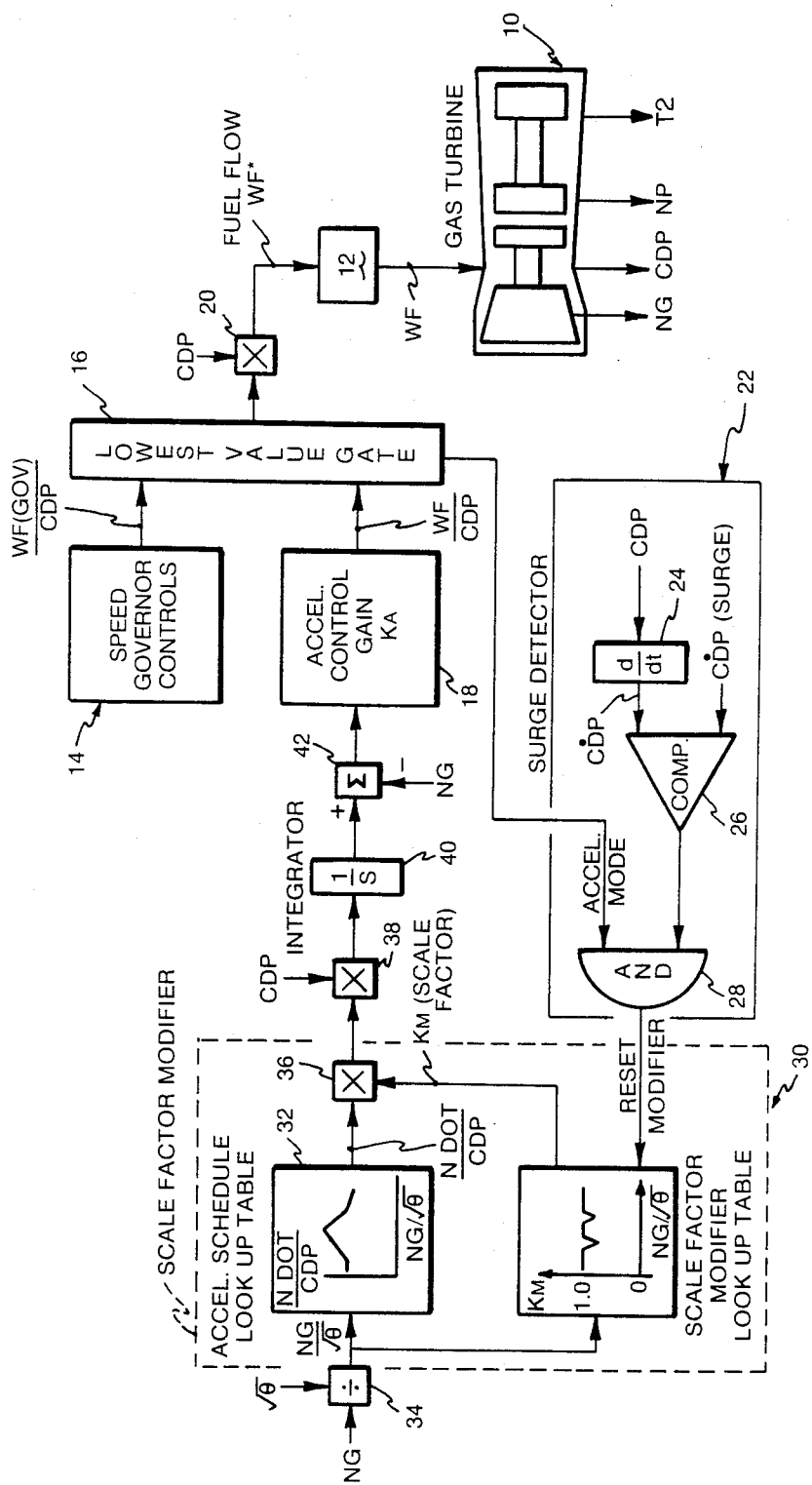
FIG. 5 is a functional block diagram of apparatus in accordance with the present invention.

With reference now to the drawing, and particularly to FIG. 5, a closed loop electronic fuel control is depicted in the form of a functional block diagram. The fuel control adjusts the rate of flow of a combustible fuel to a gas turbine engine, indicated generally at 10, by delivering a fuel flow demand signal WF* to a fuel metering system 12. In response to the input signal supplied thereto, metering system 12 will cause the rate of flow WF of pressurized fuel to engine 10 to be varied in accordance with the operating conditions and, in an aircraft environment, in accordance with the pilot's command. Engine 10 will, as is standard practice in the art, be instrumented such that signals commensurate with a plurality of engine operating parameters will be provided. These operating parameter signals will include gas generator speed NG, compressor discharge pressure CDP, power turbine speed NP and gas generator compressor inlet temperature T2.

The WF* signal delivered to the metering system 12 will be that one of several simultaneously generated fuel flow rate related signals which corresponds to the lowest value of fuel flow. Thus, a plurality of fuel flow related signals may be provided by speed governors which have been indicated generally at 14. These speed governors may be prior art electronic governors or they may be governors of the type described in contemporaneously filed application Ser. No. 369,530, entitled "Gas Turbine Engine Fuel Control".

The fuel flow related signal or signals provided by the governors 14 are delivered to an auctioneering circuit or lowest value gate 16. A fuel flow related signal from an acceleration gain control 18, which is in part derived from a pre-programmed acceleration schedule, is also delivered as an input to gate 16. The fuel flow related signal passed by gate 16 is delivered to an altitude compensation circuit 20 wherein it is multiplied by a signal commensurate with the actual instantaneous compressor discharge pressure (CDP) which, presuming that the engine is not in surge, is related to altitude. The output of compensation circuit 20 is the WF* command signal for the metering system 12.

The gas generator compressor discharge pressure (CDP) signal provided by the engine sensor is also delivered as the input to a surge detector which has been indicated generally at 22. In surge detector 22 the CDP signal is differentiated, in a differentiator 24, to provide a $\dot{CDP}$ signal the magnitude of which is a measure of the rate of change of gas generator compressor discharge pressure.

The output of differentiator 24 and a surge limit signal, i.e., a constant commensurate with a value of $\dot{CDP}$ which corresponds to an engine surge, are compared in a comparator 26. The magnitude of the constant delivered to comparator 26 will be such that the comparator will provide a first input to an AND gate 28 when the rate of change of the compressor discharge pressure is greater than the predetermined surge limit level, i.e., gate 28 will be enabled when the engine is in surge. The second input to gate 28 will be a signal provided by gate 16 which is indicative of the passage, to compensation circuit 20, of the acceleration limit signal provided by gain control circuit 18. Thus, "AND" gate 28 will provide a reset signal to a scale factor modifier, indicated generally at 30, when the engine is in the acceleration mode and a surge occurs.

As previously discussed, in the acceleration mode the fuel control will vary the rate of delivery of fuel to the engine as required by an acceleration schedule. This acceleration schedule will have been provided by the manufacture, will pertain to the engine in its new and thus presumably rated condition and will be stored in the suitable memory or look-up table 32. As depicted in FIG. 5, the acceleration schedule comprises a plot of the ratio of rate of change of gas generator speed to compressor discharge pressure (NDOT/CDP) versus the ratio of gas generator speed to corrected inlet temperature (NG/$\sqrt{\theta}$). Thus, ratio NG/$\sqrt{\theta}$, as provided by a divider 34, addresses memory 32 so as to read out an NDOT/CDP value for each value of the NG/$\sqrt{\theta}$ ratio. The value read out of memory 32 is applied to a multiplier 36 wherein it is multiplied by an output signal provided by modifier 30 as will be described in greater detail below. Suffice it for the present to note that the output of multiplier 36 will be a $(K_M)$ (NDOT/CDP) signal, i.e., a value derived from the stored acceleration schedule as modified by the scale factor $K_M$.

The modified NDOT/CDP signal is multiplied, in a further multiplier 38, by a signal commensurate with the actual sensed value of CDP to provide an NDOT signal which is integrated, in integrator 40, to provide a gas generator speed signal as determined by the modified value taken from the acceleration schedule. The NG signal provided by integrator 40 is algebraically summed, in a summation circuit 42, with the actual instantaneous NG to provide an NG error signal. The NG error signal is delivered to the acceleration gain control circuit 18 wherein a fixed gain of fuel flow per compressor discharge pressure is computed as a function of the speed error.

Figure 1:
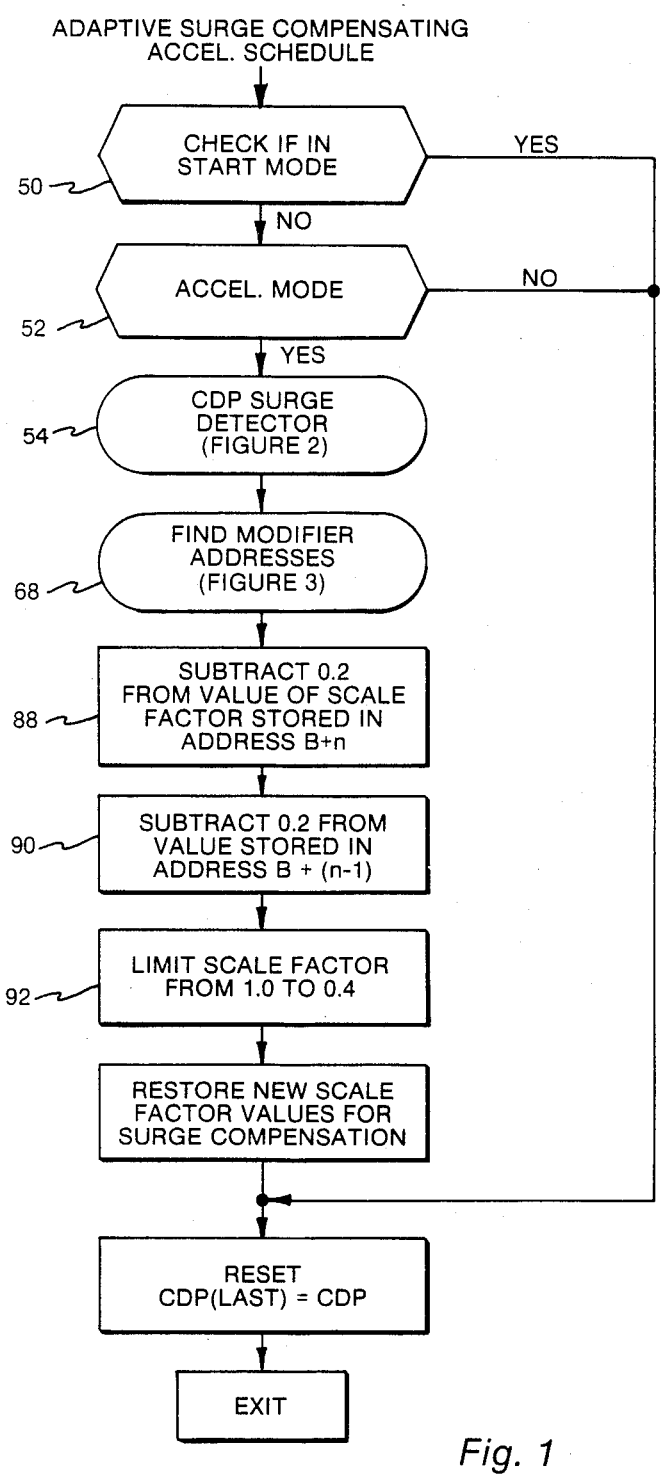
FIGS. 1, 2 and 3 constitute a data flow diagram representing the control mode of the present invention.
Figure 2:
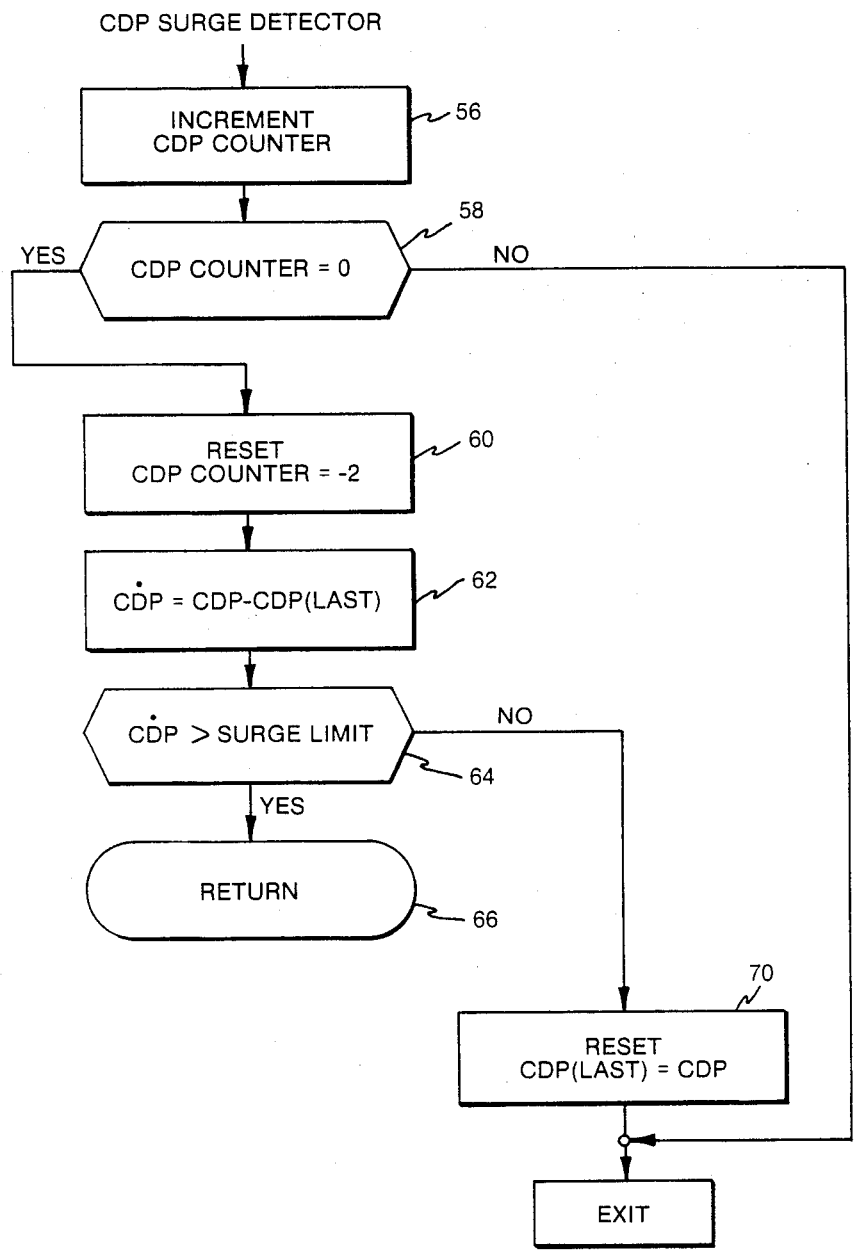
Figure 3:
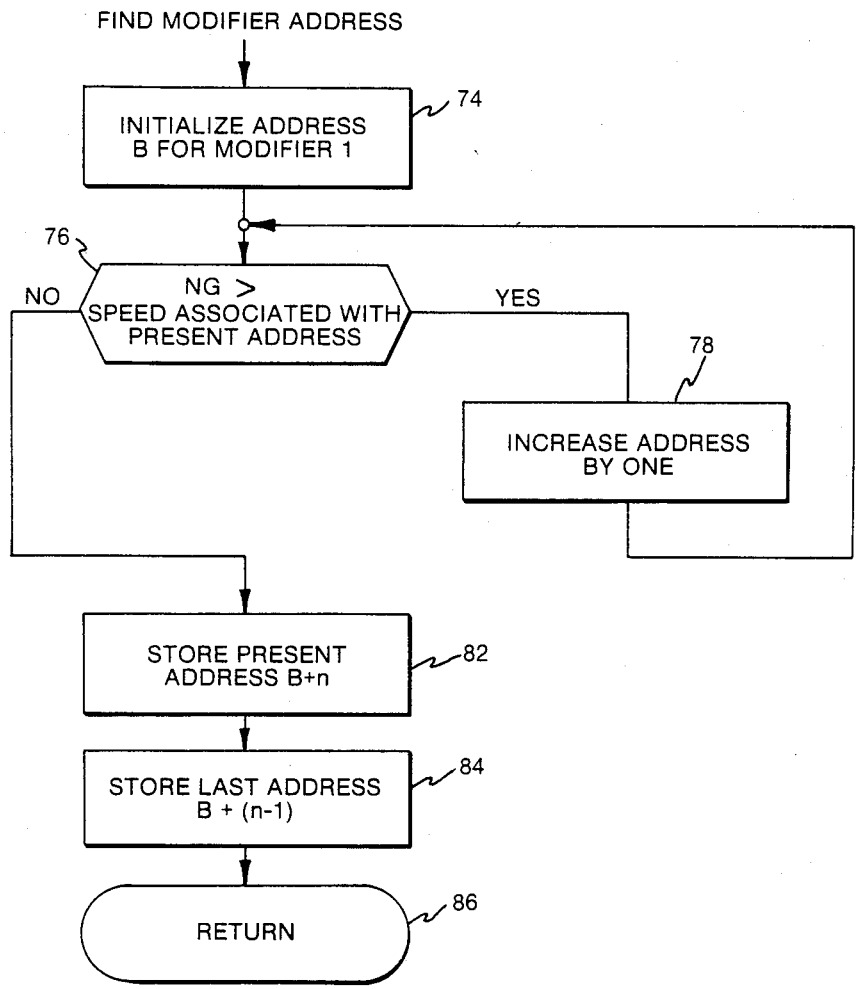

Referring now to FIGS. 1 through 4, the control mode of the present invention, particularly the scale modifier 30, may be implemented in the form of a suitably programmed microprocessor which functions in accordance with the flow diagram of FIGS. 1–3. Initially, as indicated at 50, the gas generator speed NG is sensed to determine whether the speed is below 60% of maximum. The purpose of this test is to eliminate the possibility of effecting a modification of the acceleration schedule as a result of engine parameters sensed during start-up. If the speed is not less than 60% of maximum, as indicated at 52, a determination is made as to whether the engine is in fact in the acceleration mode. If the engine is in the acceleration mode a surge detection subroutine 54, which is represented in FIG. 2, is implemented. This routine calls for a compressor discharge pressure timing counter, which is initially set to minus two, to be incremented by one as indicated at 56. The state of the counter is then sensed, as indicated at 58 and, if the count is at zero indicating a fixed timing interval of two computer cycles, the CDP counter is reset to −2 in step 60. At this time, as indicated at 62, the present input sampling of CDP is compared to the value of CDP that was input when the counter was last at zero. This represents values of CDP at the beginning and end of a fixed time increment used for differentiation. The difference between the present and last CDP represents $\dot{CDP}$ which is compared with the surge limit in step 64. If $\dot{CDP}$ is greater than the surge limit, indicating that a surge has occurred, there will be a return to the surge compensating routine, as indicated at 66, in order to find the modifier address as indicated at 68 in FIG. 1. However, if the rate of change of CDP is less than the surge limit, the last value of compressor discharge pressure will, as indicated at 70, be reset to the present value of CDP for recomputing $\dot{CDP}$. The surge detector subroutine is then exited back to the main program. If the count resulting from the incrementing of the CDP counter in step 56 does not result in zero, indicating that the differentiating time has not expired, the subroutine will also be exited back to the main program.

If the surge limit has been exceeded, the modifier address will be found in the manner indicated in FIG. 3. Thus, as indicated at 74, and as may also be seen by reference to FIG. 4, the modifier address is initialized to the lowest corrected speed setting.

Next, a determination is made as to whether the actual present gas generator speed is greater than the speed associated with the look-up table address. If the answer to this inquiry, which is indicated at 76, is in the affirmative, the address is incremented by one as indicated at step 78. Return is then made and the comparison is repeated. If the gas generator speed is less than the speed associated with the present address, however, the present address B+n and the last address B+(n−1) are stored as respectively indicated at 82 and 84 and there is return, as indicated at 86, to the surge compensating routine (FIG. 1). Returning now to FIG. 1, and as indicated at 88, the value 0.2 will be subtracted from the scale factor stored at address B+n in the modifier memory. Also, as indicated at 90, 0.2 is also subtracted from the value stored at the modifier address B+(n−1).

A comparison will be made to the modified scale factors, as indicated at 92, to insure that the modifiers are not reduced below 0.4. Thereafter, the new values of the scale factors are stored back in the memory look-up table at their respective addresses, B+n and B+(n−1).

Referring to FIG. 4, a tabulation is provided which, it is believed, will facilitate understanding of the invention. The acceleration schedule addresses A---A+n----A+m are the addresses in memory 32 where the NDOT/CDP acceleration values, respectively NDOT/CDP(o)---NDOT/CDP(n)---NDOT/CDP(m) are stored. These acceleration values correspond to respective engine speed points NG(o)---NG(n)---NG(m).

The modifier addresses which correspond to the addresses of memory 32 are identified by the operator B and the modifier values stored at these addresses are represented in the last column of the look-up table of FIG. 4. As indicated above, initially the stored modifier values will all be equal to one (1). The equations on FIG. 4 show how the acceleration schedule is interpolated between two look-up table points and how the modifier scale factor is interpolated from two look-up table points.

Figure 6:
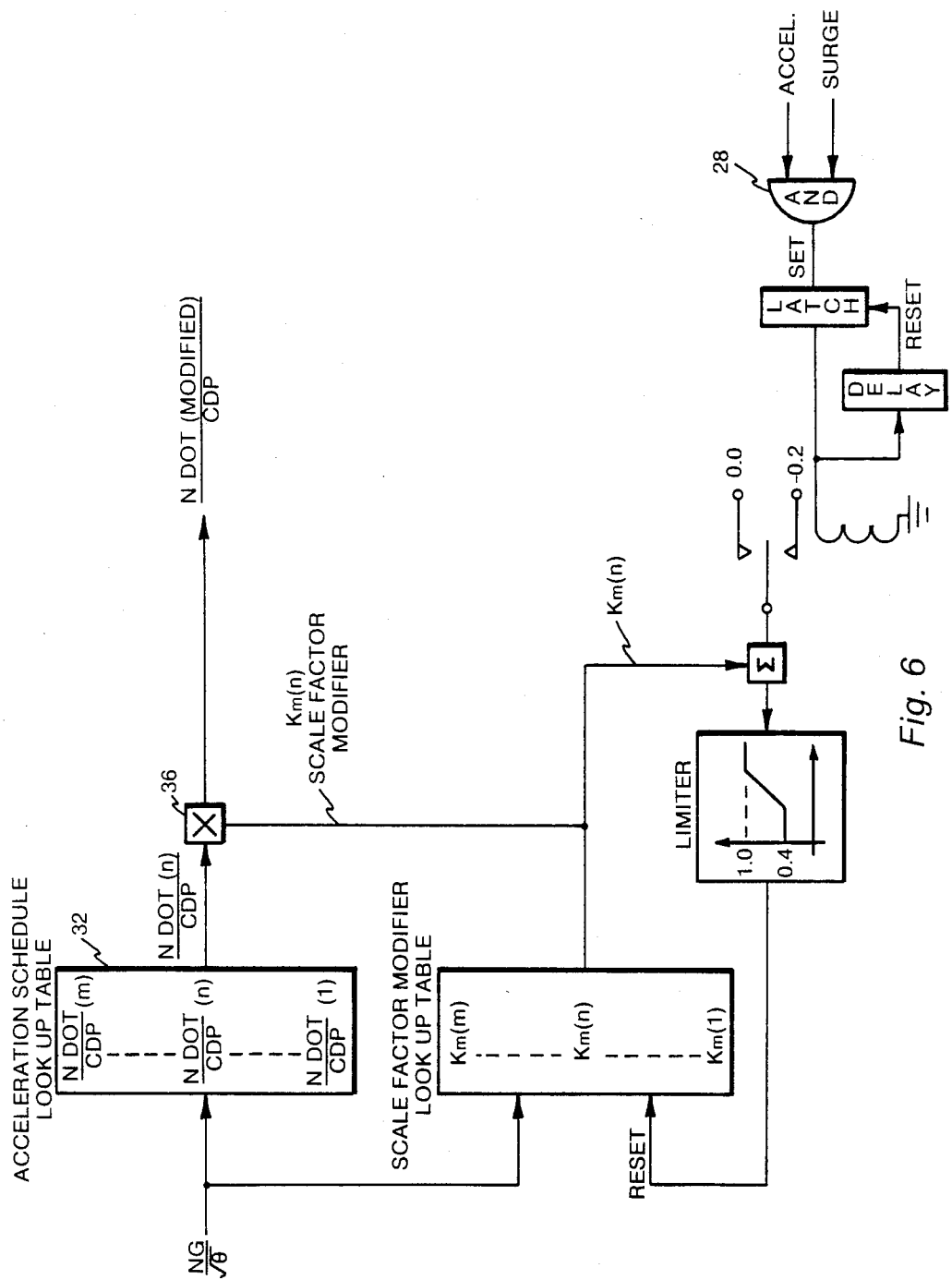
FIG. 6 is an expanded functional block diagram of the scale factor multiplier of FIG. 5.

FIG. 6 is a functional block diagram of the scale factor modifier of FIG. 5.

The present invention is applicable to either open or closed loop controls.

While a preferred embodiment has been shown and described, various modifications and substitutions may be made thereto without departing from the spirit and scope of the invention. Accordingly, it is to be understood that the present invention has been described by way of illustrations and not limitation.

What is claimed is:

1. In a method for the exercise of control over the delivery of fuel to a gas turbine engine, the engine including a gas generator having a compressor, the engine further including a fuel metering system which is responsive to fuel flow command signals for varying the rate of delivery of fuel to the engine, an improved mode of varying fuel flow during acceleration of the engine comprising:

storing data comprising an engine acceleration schedule which defines a ratio of a rate of change of gas generator speed to compressor discharge pressure for ratios of gas generator speed to compressor inlet temperature during acceleration, the acceleration schedule comprising a curve defined by a series of points;

storing modifier values which correspond to the stored acceleration schedule data;

detecting engine surges;

varying at least that stored modifier value which corresponds to the point on the acceleration schedule at which a surge has occurred during one acceleration;

combining the acceleration schedule data with the modifier values whereby the schedule data will be varied during accelerations occurring subsequent to the said one acceleration; and deriving fuel flow commands from the combined acceleration schedule data and modifier values.

2. The method of claim 1 wherein the stored modifier values are all initially the same.

3. The method of claim 2 wherein the step of deriving includes:

adjusting the combined data in accordance with the actual compressor discharge pressure to provide a rate of change of gas generator speed command.

4. The method of claim 3 wherein the step of detecting engine surges comprises:

determining whether the engine is in an acceleration mode;

sensing the rate of change of compressor discharge pressure;

comparing the rate of change of compressor discharge pressure with a preselected maximum permissible rate of change of compressor discharge pressure; and providing an indication that a stored modifier value should be varied when the engine is in the acceleration mode and the actual rate of change of the compressor discharge pressure exceeds the preselected maximum permissible rate of change of compressor discharge pressure.

5. The method of claim 1 wherein the step of deriving a fuel flow command includes:

adjusting the combined acceleration schedule data and modifier values in accordance with the actual compressor discharge pressure to provide a rate of change of gas generator speed command.

6. The method of claim 1 wherein the step of detecting engine surges comprises:

determining whether the engine is in an acceleration mode;

sensing the rate of change of compressor discharge pressure;

comparing the rate of change of compressor discharge pressure with a preselected maximum permissible rate of change of compressor discharge pressure; and providing an indication that a stored modifier value should be varied when the engine is in the acceleration mode and the actual rate of change of the compressor discharge pressure exceeds the preselected maximum permissible rate of change of compressor discharge pressure.

* * * * *